(12) United States Patent
Trisnadi et al.

(10) Patent No.: US 7,986,603 B1
(45) Date of Patent: Jul. 26, 2011

(54) SPATIAL LIGHT MODULATOR FOR HOLOGRAPHIC DATA STORAGE

(75) Inventors: Jahja I. Trisnadi, Cupertino, CA (US); Alexander P. Payne, Ben Lomond, CA (US); Clinton B. Carlisle, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 344 days.

(21) Appl. No.: 12/286,295

(22) Filed: Sep. 29, 2008

Related U.S. Application Data

(60) Provisional application No. 60/997,121, filed on Sep. 29, 2007.

(51) Int. Cl.
*G11B 7/00* (2006.01)
(52) U.S. Cl. ...................................................... 369/103
(58) Field of Classification Search ........................ None
See application file for complete search history.

(56) References Cited

U.S. PATENT DOCUMENTS

| | | | |
|---|---|---|---|
| 2004/0145994 A1* | 7/2004 | Tsukagoshi | 369/103 |
| 2005/0207313 A1* | 9/2005 | Handschy et al. | 369/103 |
| 2007/0268547 A1* | 11/2007 | Latypov et al. | 359/237 |

\* cited by examiner

*Primary Examiner* — Joseph Haley
(74) *Attorney, Agent, or Firm* — William E. Nuttle

(57) ABSTRACT

A holographic data storage (HDS) system and method are provided. Generally, the system includes: a light source for generating a coherent light; beam-forming optics for forming the light into collimated object and reference beams; holographic storage medium; a spatial light modulator (SLM) located in a path of the object beam from the beam-forming optics to the storage medium, the SLM having a number of pixels for encoding data to be stored in the medium into the object beam. Preferably, the SLM can modulate both the amplitude and phase of light from every pixel on the SLM. More preferably, the SLM is also located in a path of the reference beam to the storage medium to modulate the phase of the light to store multiple holographic pages of data in the same physical volume of medium through phase multiplexing. Other embodiments are also described.

14 Claims, 6 Drawing Sheets

(a)  (b)  (c)

SPATIAL LIGHT MODULATOR FOR HOLOGRAPHIC DATA STORAGE

CROSS-REFERENCE TO RELATED APPLICATIONS

The present application claims the benefit of priority under 35 U.S.C. 119(e) to U.S. Provisional Patent Application Ser. No. 60/997,121, entitled "Spatial Light Modulator for Holographic Data Storage," filed Sep. 29, 2008, which application is hereby incorporated by reference in its entirety.

TECHNICAL FIELD

The present invention relates generally to spatial light modulators, and more particularly to spatial light modulator and methods for using the same for holographic data storage.

BACKGROUND

Holographic storage memory systems operate by combining a data-encoded object (or data) beam with a reference beam to create an interference pattern inside a photosensitive storage medium. The interference pattern induces material alterations in the storage medium that generate a hologram. The data is read by sending the same reference beam used to record the hologram into the storage medium. The storage medium will diffract the reference beam reconstructing the stored object beam, which may then be captured by an imager (typically an array of photosensitive elements) and converted to an electronic data signal.

A schematic diagram of a conventional holographic data storage (HDS) system is shown in FIGS. 1A and 1B. FIG. 1A illustrates the HDS system recording data, and FIG. 1B illustrates reading or recalling data.

Referring to FIG. 1A, during the recording process, the reference beam 102 and the object (or data) beam 104 interfere inside the recording volume of a holographic storage medium 106. The two beams originate from the same laser (not shown) and are coherently related. The data to be stored is imprinted in a transverse spatial extent of the object beam 104 by means of a spatial light modulator (SLM 108). Conventional HDS systems employ amplitude modulators—usually binary state only in which the modulator is either ON or OFF. The reference beam 102 is, in the simplest case, a plane wave with specific incident angle. The complex interference pattern between the reference and object beams induces a permanent or semi-permanent index variation in the holographic storage medium 106. Typically, $10^6$-$10^8$ bits of binary data can be stored in a single holographic image or hologram, commonly referred to as a page. Multiple hologram pages can be stored in the same physical volume of the holographic storage medium 106 by multiplexing (e.g. angle multiplexing as depicted in FIG. 1A).

Referring to FIG. 1B, to recall a particular hologram page, the same reference beam 102 used to record a particular hologram page is sent to through the holographic storage medium 106. The particular page will diffract the reference beam 102, reconstructing the object beam 104 as encoded with stored data, an imager 110, such as an array of charge—coupled devices (CCD), or a CMOS array captures the reconstructed object image and converts it to electronic data.

Conventional HDS systems all suffer from one or more drawbacks or disadvantages. Referring to FIGS. 1A and 1B, the most common multiplexing method is angular multiplexing in which each hologram page is recorded indexing the reference beam 102 at angle (θ), which are Bragg discriminated from others. This method requires high precision mechanical indexing of the reference beam 102, typically using a mechanism that is relatively slow and subject to wear.

A further disadvantage of conventional HDS systems is the limit on the amount of data that can be stored in a given holographic medium volume imposed by the resolution of the system. In general, for a given optics (i.e. pupil size), the size of a pixel in the SLM is the smallest resolvable feature that can be stored in the medium. Smaller features may be imaged, and therefore stored, but only with rapidly decreasing contrast, which reduces the reliability of the data storage.

Accordingly, there is a need for a holographic data storage system and a method of using the same to quickly and reliably store multiple pages of data without the need for mechanical indexing of a reference beam and with increased data resolution.

The present invention provides a solution to these and other problems, and offers further advantages over conventional spatial light modulators and holographic data storage systems and methods of operating the same.

SUMMARY

A spatial light modulator and methods for using the same to holographically store data are provided. Generally, the system includes a light source for generating a coherent light; beam-forming optics for forming the light into collimated object and reference beams; holographic storage medium; and a spatial light modulator (SLM) located in a path of the object beam from the beam-forming optics to the storage medium, the SLM having a number of pixels for encoding data to be stored in the medium into the object beam. Preferably, the SLM can modulate both the amplitude and phase of light from every pixel on the SLM. More preferably, the SLM or another SLM is also located in a path of the reference beam to the storage medium to modulate the phase of the light to store multiple holographic pages of data in the same physical volume of medium through phase multiplexing.

In one embodiment, the SLM includes a plurality of pixels, each pixel including a plurality of phase shift elements. The SLM also includes a transform filter adapted to control the imaging system to resolve light reflected from each pixel but not light reflected from each phase shift element in each pixel. The pixels are capable of independently modulating phase and magnitude of light reflected therefrom.

BRIEF DESCRIPTION OF THE DRAWINGS

These and various other features of the interface device and methods for using the same will be apparent upon reading of the following detailed description in with the accompanying drawings and the appended claims provided below, where:

DETAILED DESCRIPTION

The present invention is directed to holographic data storage (HDS) systems and methods of using the same to quickly and reliably store multiple pages of data without the need for mechanical indexing of a reference beam and with increased resolution.

An (HDS) system and a method of using the same according to one embodiment of the present invention will now be described with reference to FIGS. 2A and 2B.

Figure 1A:
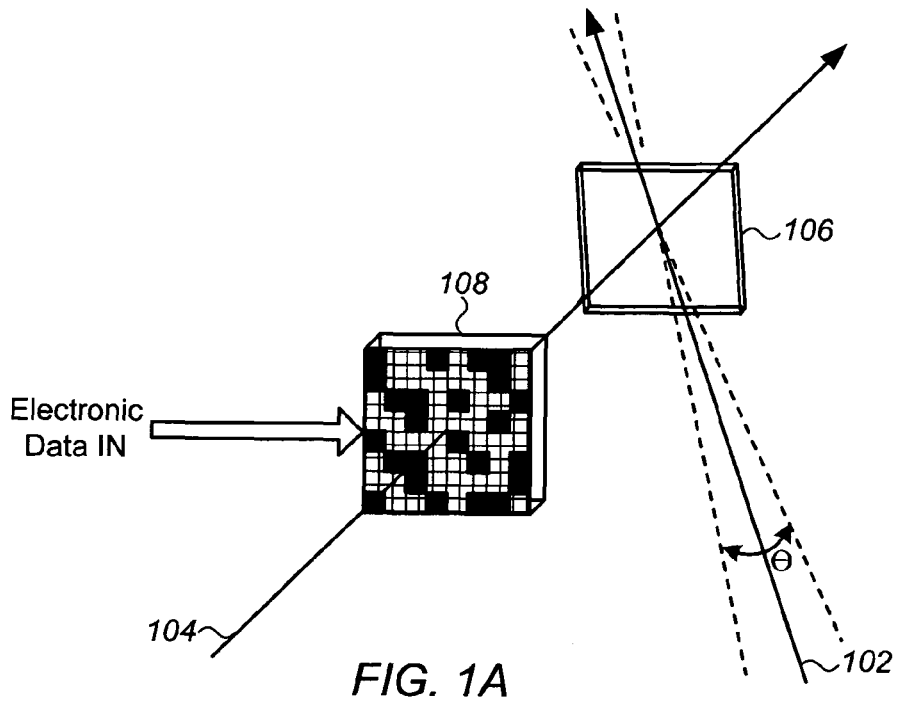
FIG. 1A is a schematic block diagram illustrating a conventional holographic data storage (HDS) system configured to record data.
Figure 1B:
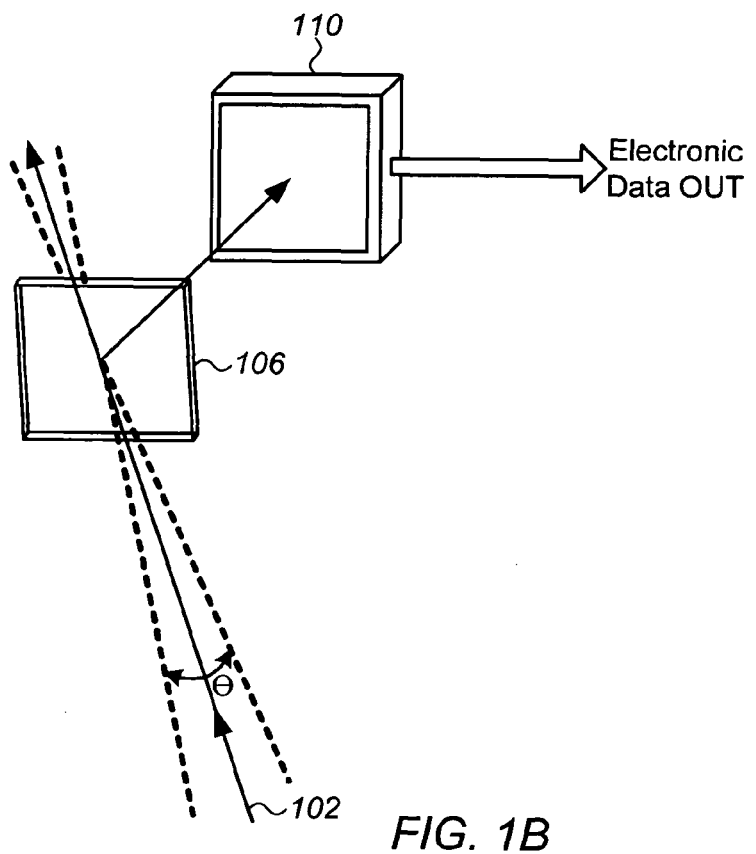
FIG. 1B is a schematic block diagram of the HDS system configured to recall data.
Figure 2A:
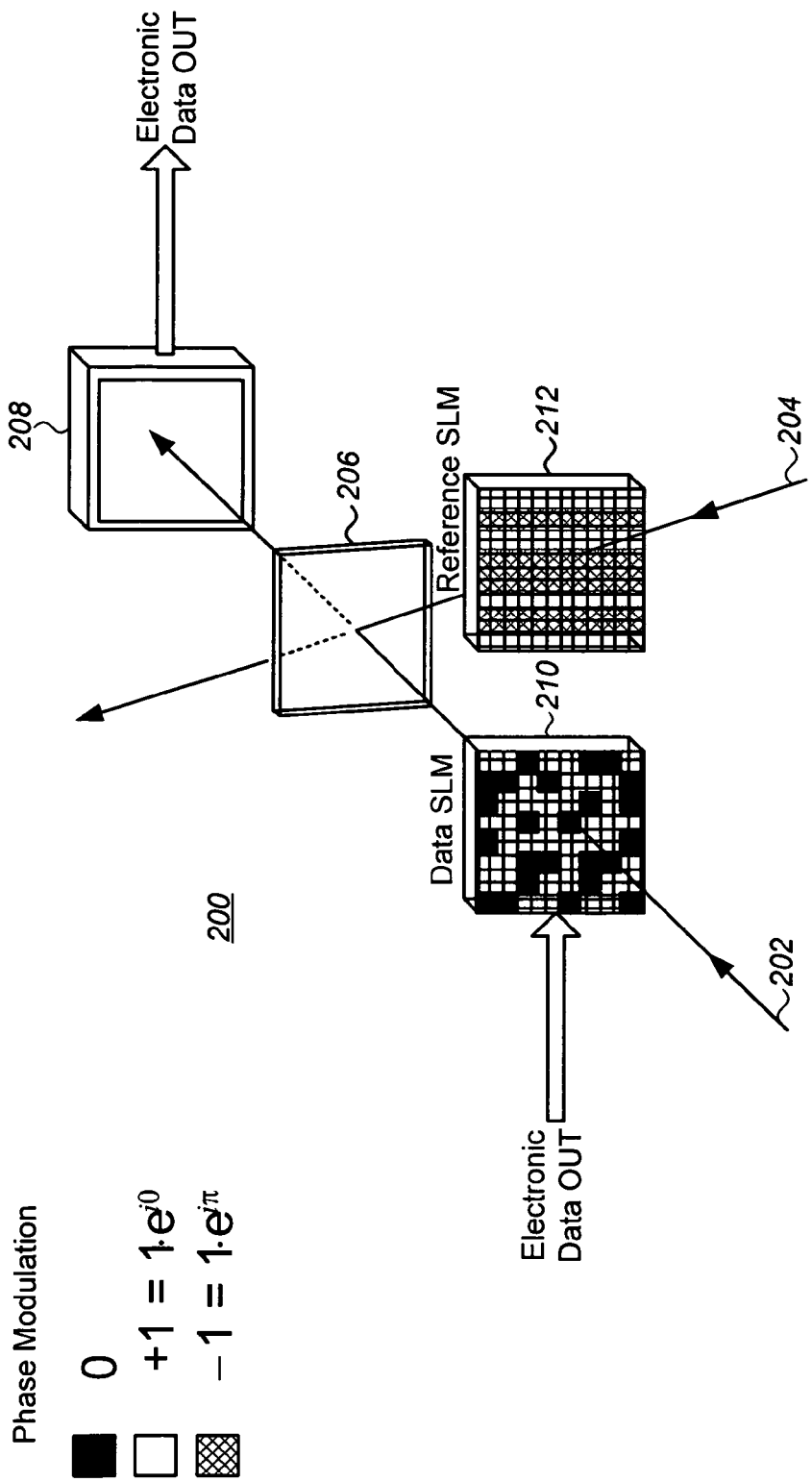
FIG. 2A is a schematic block diagram of a HDS system according to an embodiment of the present invention.

Referring to FIG. 2A, the HDS system 200 includes a light source (not shown), such as a laser, for generating a coherent light, beam-forming optics (also not shown) for forming the coherent light into a collimated object beam 202 and a reference beam 204, and a holographic storage medium 206. Suitable, light sources can include, for example, lasers operating in wavelengths from deep ultraviolet (DIJV) to near infrared (IR). Suitable holographic storage media 206 include, for example, photopolymer films and photorefractive materials whose refractive index can be changed locally by space-charge carrier. Generally, the HDS system 200 further includes an imager 208, which can comprise an array of photosensitive devices such as charge-coupled devices (CCDs) or a complementary metal oxide semiconductor (CMOS) array, to capture a recalled object image from the storage medium 206 and convert it back into electronic data.

In accordance with the present invention the HDS system 200 further includes a data spatial light modulator (SLM 210) located in a path of the object beam 202 from the beam-forming optics to the holographic storage medium 206, the SLM having a number of pixels for encoding into the object beam electronic data to be stored in the storage medium. Preferably, the data SLM 210 can modulate the amplitude or both the amplitude and phase of the light from every pixel of the SLM to generate individual beams of light from the coherent beam to be recorded in the holographic storage medium 206.

More preferably, as in the embodiment shown, the HDS system 200 further includes a second or reference SLM 212 in the light path of the reference beam 204 from the beam-forming optics to the storage medium 206. Like the object or data SLM 210, the reference SLM 212 includes a number of pixels and is adapted to modulate the phase of the light from every pixel to store multiple holographic pages of data in the same physical volume of medium 206 through phase multiplexing.

Figure 2B:
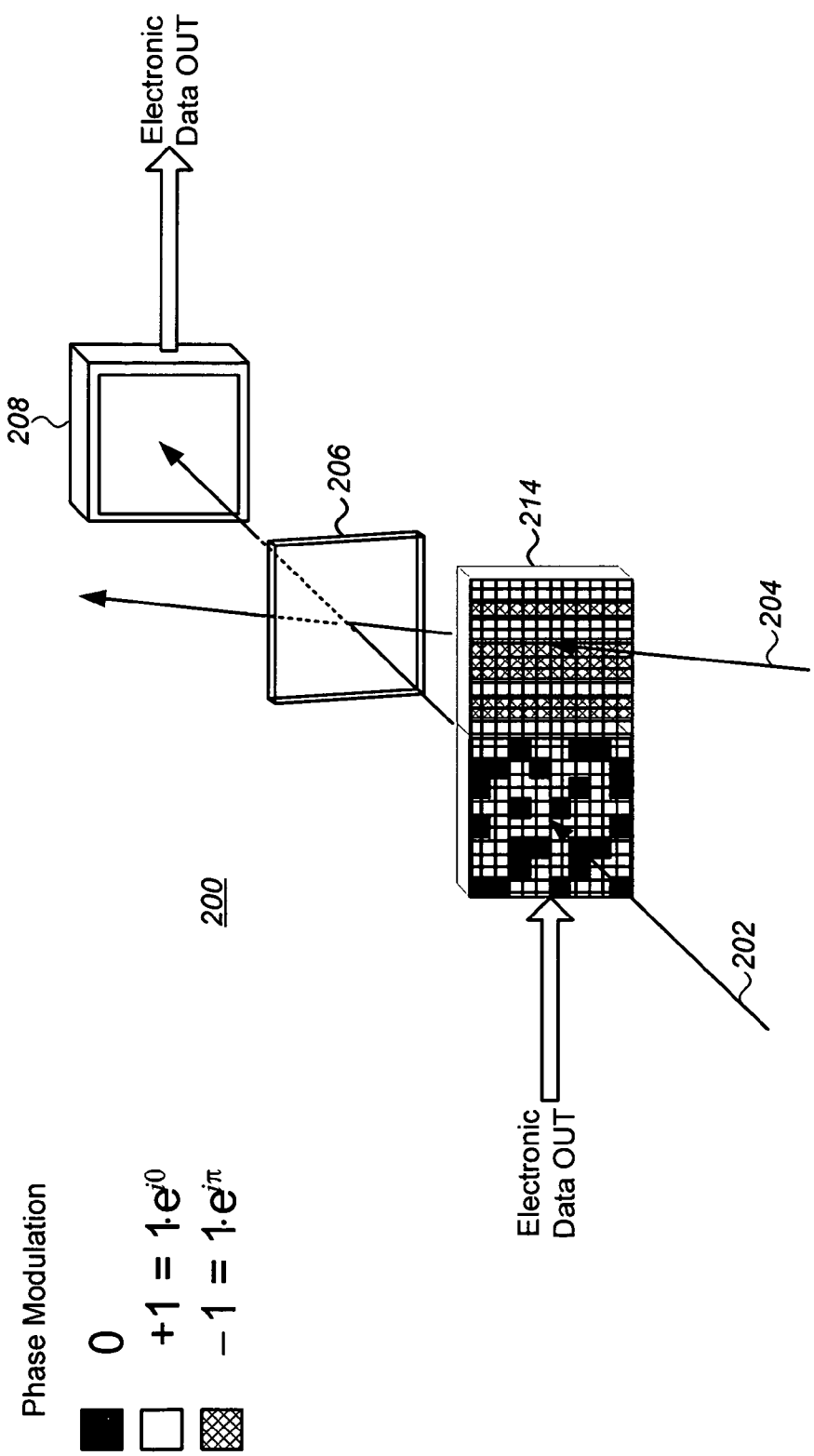
FIG. 2B is a schematic block diagram of a HDS system having an integrated data and reference Spatial Light Modulator (SLM) according to another embodiment of the present invention.

In another embodiment, shown in FIG. 2B, the functions of the data SLM 210 and the reference SLM 212 are combined into a single, integrated SLM 214.

Although shown in FIGS. 2A and 2B as a transmissive HDS system, it will be understood that these figures are intended only to show in schematic form locations of various elements, including the SLMs, in light paths of the data and reference beams. It will further be understood that either or both of the SLMs can operate in a transmissive or reflective mode without departing from the scope of the present invention.

Figure 3:
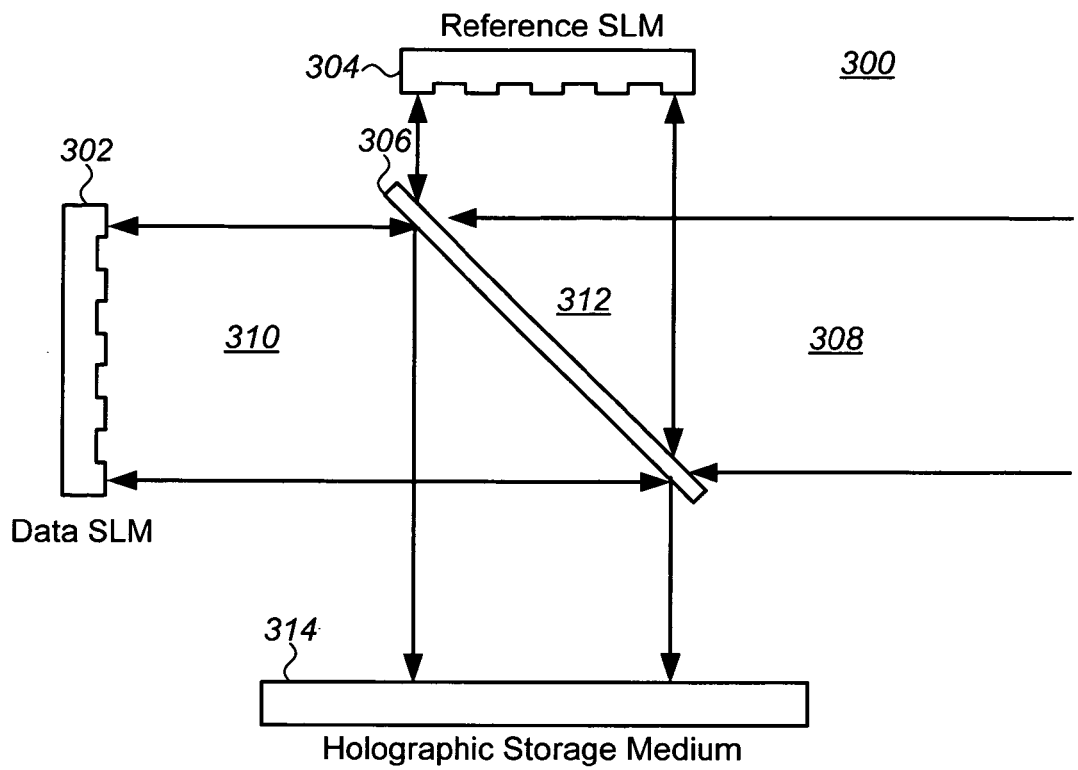
FIG. 3 is a schematic block diagram of a HDS system according to another embodiment of the present invention.

In another embodiment, shown in FIG. 3, the HDS system 300 includes reflective data and reference SLMs 302, 304 spaced apart at right angles to one another, and one or more beam splitters 306 or half-silvered mirrors. The beam splitter 306 directs collimated light 308 from a coherent light source (not shown) onto the SLMs 302, 304, and amplitude and/or phase modulated data beam 310 and reference beam 312 from the SLMs to a holographic storage medium 314. Generally, the HDS system 300 further includes an imager (not shown in this figure), such as an array of CCDs or a CMOS array, on the opposite side of the storage medium 314 to capture a recalled object image and convert it to electronic data. Preferably, the data SLM 302 is a complex SLM capable of independently modulating both phase and amplitude of the reflected light. In some versions of this embodiment, the reference SLM 304 is an analog device comprising a single, unbroken reflective surface that modulates substantially only the phase of the reference beam 312 relative to the data beam 310.

Figure 4:
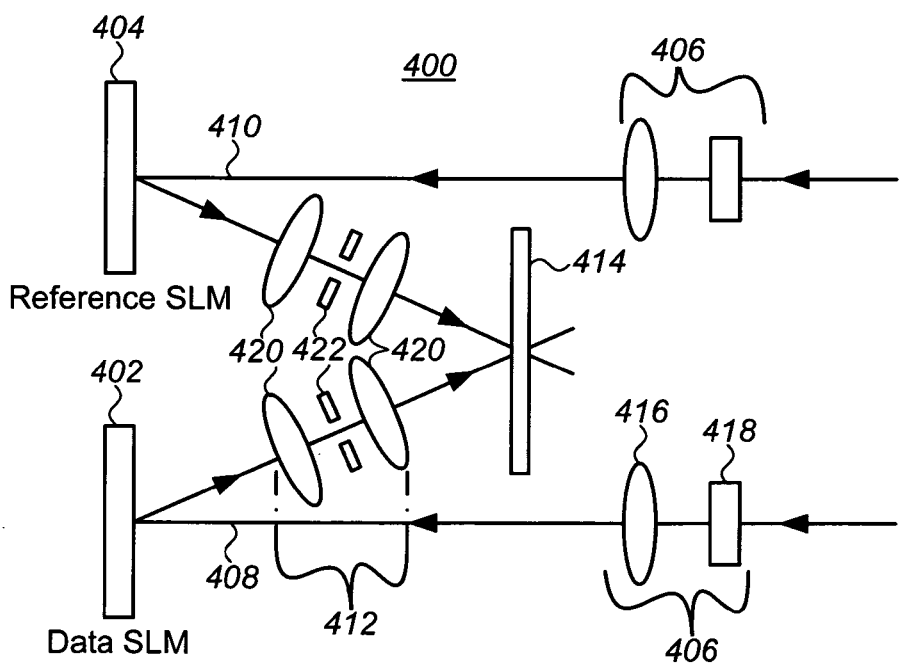
FIG. 4 is a schematic block diagram of a layout for a reflective HDS system according an embodiment of the present invention.

In still another embodiment, shown in FIG. 4, the HDS system 400 includes reflective data and reference SLMs 402, 404. Referring to FIG. 3, the HDS system 400 further includes a light source (not shown), such as a laser, for generating a coherent light, one or more sets of beam-forming optics 406 for forming the coherent light into a collimated object beam 408 and a reference beam 410, and imaging optics 412 to direct an image (modulated light) from the SLM 402, 404, to a holographic storage medium 414. Generally, the HDS system 400 further includes an imager (not shown in this figure), such as an array of CCDs or a CMOS array, to capture a recalled object image and convert it to electronic data.

The beam-forming optics 406 can comprise a number of elements including lens 416, integrators, mirrors and prisms 418, designed to transfer light from the light source to the SLMs 402, 404, such that a specified area is illuminated on the SLMs. Preferably, the beam-forming optics 406 are designed to illuminate substantially the entire reflective surface of the data and reference SLMs 402, 404.

The imaging optics 412 can include magnification elements, such as one or more Fourier Transform (FT) lens 420, to direct the light from the SLMs 402, 404, to the. Preferably, as in the embodiment shown, the imaging optics 412 further includes a number of filter elements, such as a FT filter 422, to resolve light reflected from each pixel but not light reflected from each individual diffractor in each SLM 402, 404.

In a preferred embodiment, one or both of the data and reference SLMs are two-dimensional MEMS-type SLMs, also known as a Planar Light Valve™, such as that described in commonly assigned U.S. Pat. No. 7,064,883. More preferably, the SLM is a complex SLM, such as that described in commonly assigned U.S. Pat. No. 7,227,687, capable of both amplitude and phase modulation singly or in combination.

Figure 5:
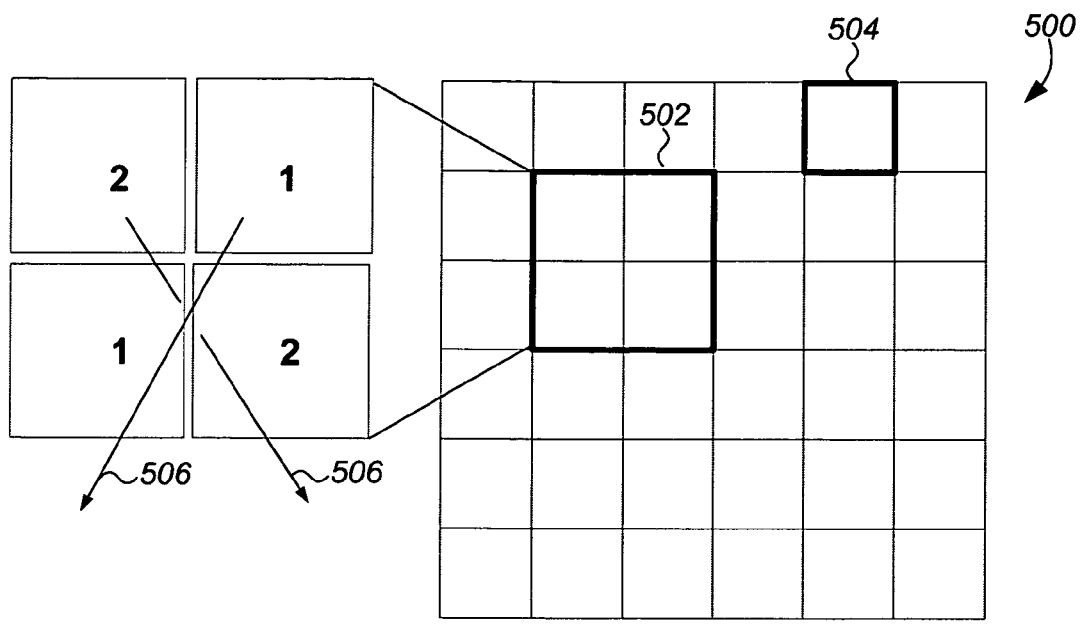
FIG. 5 is a planar view top of a complex SLM suitable for use with a HDS system according to an embodiment of the present invention.
Figure 6:
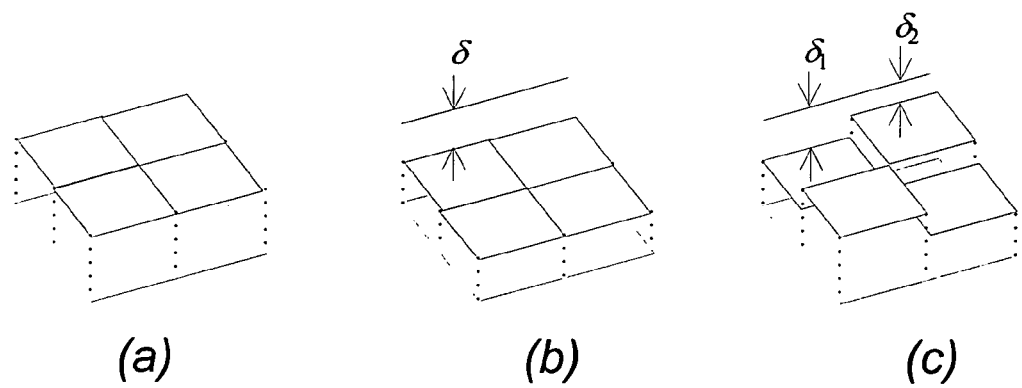
FIG. 6 depict perspective views of a pixel of the complex SLM of FIG. 5 in (a) quiescent, (b) phase-modulated and (c) amplitude and phase modulated mode.

A planar top view and side view of one such embodiment of a complex SLM is shown in FIG. 5. Briefly, the complex SLM 500 includes multiple pixels 502, each pixel including a multiple phase shift elements 504 or diffractors. The phase shift elements 504 each include an electrostatically displaceable reflective surface or mirror. The phase shift elements 504 are configured such that substantially all light reflected from the SLM 500 comes from the phase shift elements. Preferably, phase shift elements 504 along diagonal lines 506 are coupled to deflect in unison, by electrically interconnecting drive electrodes (not shown) below each phase shift element and applying a common drive voltage. In this way, each pixel 502 receives two independent driving voltages to deflect diagonally opposed phase shift elements 504 as a group, denoted as mirror group 1 and mirror group 2 in FIG. 5. The two mirror groups of each pixel 502 can be controlled independently of the others to allow coherent light reflected from one pixel to constructively or destructively interfere with light reflected from one or more adjacent pixels, thereby modulating the light incident thereon. More preferably, the phase shift elements 504 are deflectable through one or more wavelengths of light to enable both the phase and the amplitude of the reflected light to be modulated independently. FIG. 6 illustrates perspective views of a pixel of the complex SLM 500 of FIG. 5 in (a) quiescent, (b) phase-modulated and (c) amplitude and phase modulated mode, where δ is equal to a quarter wavelength of the light incident on the SLM.

Figure 7:
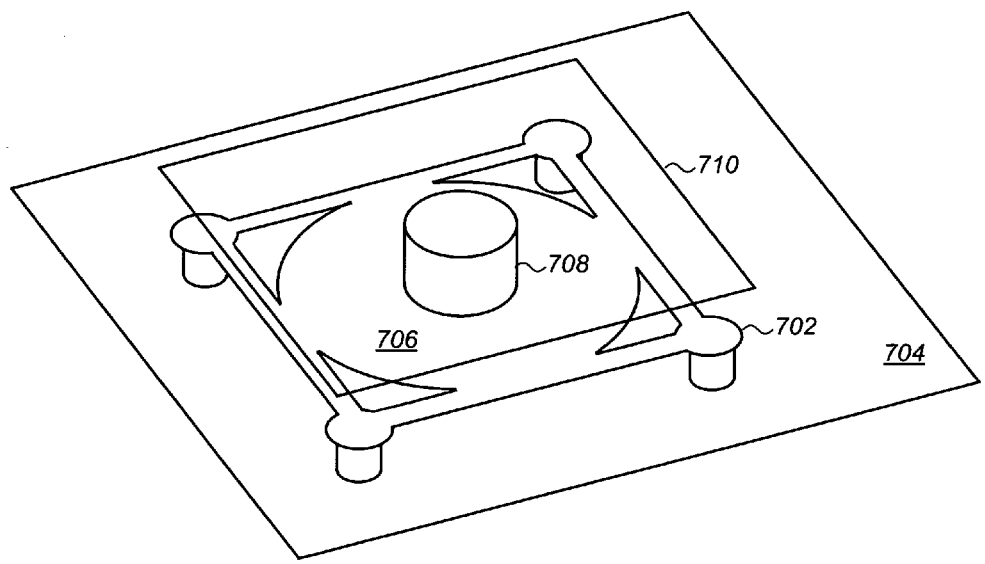
FIG. 7 depicts a detailed perspective view of a single phase shift element of a pixel according to an embodiment of the present invention.

Certain exemplary embodiments of a phase shift elements of a complex SLM will now be described in detail with reference to FIG. 7. FIG. 7 depicts a detailed perspective view of a single phase shift element 700 in the complex SLM. Referring to FIG. 7, the phase shift element 700 generally includes a film or membrane 702 disposed above an upper surface of a substrate 704 with a number of displaceable or movable portions or actuators 706 formed therein. Supported above and affixed to each actuator 706 by a support structure 708 or piston is a mirror 710 having a light reflective surface that is positioned generally parallel to the surface of the substrate 704 and oriented to reflect light incident on a top surface of the complex SLM. Each of the actuators 706 and its associated mirror 710 form an individual phase shift element 700.

Individual actuators 706 or groups of actuators are moved up or down over a very small distance (typically only a fraction of the wavelength of light) relative to the substrate 704 by electrostatic forces controlled by drive electrodes (not shown) in the substrate underlying the actuator membrane 702. Preferably, the actuators 706 can be displaced by n*λ/2 wavelength, where λ is a particular wavelength of light incident on the complex SLM, and n is an integer equal to or greater than 0. Moving the actuators 706 brings reflected light from the planar light reflective surface 710 of one phase shift element 700 into constructive or destructive interference with light reflected by adjoining phase shift elements in a pixel, thereby modulating light incident on the Complex SLM.

Analog gray scale amplitude and/or phase modulations offered by the complex SLM can potentially improve resolution enhancement further, e.g. to provide more uniform distribution to the ON states, to resolve phase inconsistency, to correct aberration etc.

In a MEMS-based complex Spatial Light Modulator, each pixel n can be dynamically and independently set to provide a modulation by $A_n \cdot \exp(i\phi_n)$. The amplitude range is $0 \leq A_n \leq 1$ (normalized) and phase-shift $0 \leq \phi_n 2\pi$.

Non-Mechanically Multiplexing

In one aspect of the present invention, phase modulation or shifting of the reference beam can be used to non-mechanically multiplex multiple pages of data to be stored within the same volume of storage medium. Embodiments of an HDS system with phase multiplexing are shown in FIGS. 2 through 4 above. Referring to these figures, in phase multiplexing the reference phase-front is encoded with phase pattern taken from an orthogonal set of phase patterns, such as the Walsh code. In phase multiplexing, a set of Bragg separated beamlets are phase encoded and simultaneously used to record a hologram page. The orthogonality ensures that each phase code only recalls a specific hologram page. Phase multiplexing allows non-mechanical, fast, page-independent access time, reliable data retrieval, and eliminates the need for a precision mechanical indexing device, such as a galvanometer scanner, commonly used in conventional HDS systems.

Resolution Enhancement

In another aspect of the present invention phase shifting of the object or data beam can be used to increase the holographic storage density of the HDS system. The holographic storage density represents the amount of data that can be stored in a given media volume. In conventional HDS system data is modulated to the object beam solely by amplitude or intensity modulation (i.e. usually binary, normalized to 0 or 1), and, for a given optics or pupil size, the size of the SLM pixel is the smallest resolvable feature that can be reliably stored in the media. Smaller features may be imaged but only with decreased contrast, which can impair reliable data retrieval.

However, in the HDS system of the present invention a phase-shift modulation, in conjunction with the standard amplitude modulation, applied to the object beam will increase the resolution of the data to be stored at the same pupil, thereby increase the holographic storage density. This is analogous to phase shift mask technique in semiconductor lithography for some time as one of resolution enhancement technique. Phase shifting provides an extra degree of freedom to the coherent addition of the image components. With two phase values, 0 or π, each component can be combined with a positive or negative sign (i.e. ternary, 0, $1 \cdot e^{i0} = +1$, or $1 \cdot e^{i\pi} = -1$). As features are made smaller, separate feature components start to overlap, reducing the image contrast. However, with the freedom to assign phase, the overlap can be made to interfere destructively, restoring the feature separation.

Figure 8:
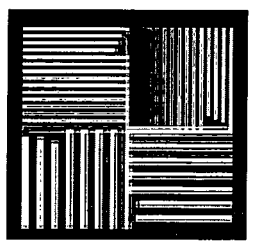
FIG. 8 depicts an image having a simple line pattern and illustrates the ability of a HDS system with phase shifting of the reference beam according to the present invention to increase resolution.
Figure 8:
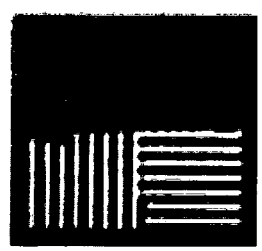
Figure 8:
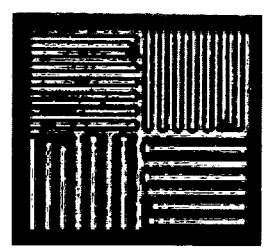

The ability of a HDS system with phase shifting of the reference beam to increase resolution is illustrated by FIGS. 8A-8C. These images generated using a complex SLM similar to that described above include a number of fine lines illustrating the effect of alternating 0 and π phase-shifts. In particular, FIG. 8A shows an original image such as would be encoded into the data beam by the data SLM, FIG. 8B shows the image reproduced such as would be recorded in the holographic storage medium without the use of phase-shift modulation; and FIG. 8C shows the image with phase-shift applied.

Extending Life of the Holographic Storage Medium

Alternatively or additionally, phase shifting of the object or data beam using a complex SLM can be used to enable increasing a diffusion of the object or data beam distribution in the holographic storage medium while maintaining a predetermined desired data density, hence preventing premature depletion of the dynamic range of the storage medium. Dynamic range refers to the response of the medium when it is repeatedly exposed to many holograms multiplexed in a common volume of material. The intense energy of a lightly diffused or undiffused object or data beam can burn or damage the holographic storage medium limiting its ability to reliably record and recover data in the future. However, phase shifting of the object or data beam using a complex SLM can enable the data beam to be diffused without reducing the data density as compared to a conventional or non-phase shifted HDS, thereby extending the dynamic range and useful life of the holographic storage medium.

The advantages of the HDS system and method of the present invention over previous or conventional systems and methods include: (i) increased data storage within a given storage medium volume through increased holographic storage density; (ii) increased stored data density through increased resolution of the image field; (iii) fast, page-independent access time, of multiple pages of stored data through non-mechanical, phase multiplexing; (iv) consolidation of object SLM and reference SLM into a single device in architecture that employs phase multiplexing; (v) improved system reliability and reduced cost made possible through the elimination of the need for a precision mechanical indexing device, such as a galvanometer scanner, commonly used in conventional HDS systems; and (vi) enabling increased diffusion of the data beam, thereby extending the dynamic range and useful life of the holographic storage medium.

Thus, HDS systems and methods for using the same to holographically store data have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly connect and to indirectly connect through one or more intervening components.

What is claimed is:

1. A holographic data storage (HDS) system comprising:
a light source for generating a coherent light;
beam-forming optics for forming the coherent light into a collimated object beam and a reference beam;
holographic storage medium;
a spatial light modulator (SLM) located in a path of the object beam from the beam-forming optics to the storage medium, the SLM having a number of pixels for encoding electronic data to be stored in the medium into the object beam; and
wherein the SLM can modulate both the amplitude and phase of the light from every pixel on the on the SLM to generate a holographic image to be recorded in the medium, and wherein each pixel of the SLM comprises a plurality of phase shift elements, and wherein the plurality of pixels are controlled to independently modulate phase and magnitude of light modulated by the SLM.

2. A system according to claim 1, wherein the SLM further comprises a substrate having an upper surface, and wherein the plurality of phase shift elements are disposed above the upper surface of the substrate, a plurality of electrostatically displaceable mirrors, where each phase shift element comprises at least one said mirror; and circuitry for applying voltages causing electrostatic forces between the substrate and the plurality of electrostatically displaceable mirrors to deflect each electrostatically displaceable mirror relative to the upper surface of the substrate.

3. A system according to claim 2, wherein the circuitry for applying the voltages to cause the electrostatic forces is controlled so that each of the plurality of electrostatic mirrors are deflectable in an analog range of distances.

4. A system according to claim 3, wherein the circuitry for applying the voltages to cause the electrostatic forces is controlled so that a gray scale is achieved in the magnitude of the light modulated by the pixels.

5. A system according to claim 1, further comprising a second, reference SLM located in a path of the reference beam from the beam-forming optics to the storage medium, wherein the reference SLM has a number of pixels and is adapted to modulate the phase of the light from every pixel on the reference SLM to store multiple holographic pages of data in the same physical volume of medium through phase multiplexing.

6. A system according to claim 1, wherein the SLM is an integrated SLM further including a number of pixels located within a path of the reference beam from the beam-forming optics to the storage medium, and wherein the SLM is adapted to modulate the phase of the light from every pixel on the reference beam to store multiple holographic pages of data in the same physical volume of medium through phase multiplexing.

7. A holographic data storage (HDS) system comprising:
a light source for generating a coherent light;
beam-forming optics for forming the coherent light into a collimated object beam and a reference beam;
holographic storage medium;
a spatial light modulator (SLM) located in a path of the object beam from the beam-forming optics to the storage medium, the SLM having a plurality of pixels and a Fourier transform filter adapted to resolve light reflected from each pixel; and
wherein each pixel includes a plurality of phase shift elements to independently modulate phase and magnitude of light reflected therefrom.

8. A system according to claim 7, further comprising a second, reference SLM located in a path of the reference beam from the beam-forming optics to the storage medium, wherein the reference SLM has a number of pixels and is adapted to modulate the phase of the light from every pixel on the reference SLM to store multiple holographic pages of data in the same physical volume of medium through phase multiplexing.

9. A system according to claim 7, wherein the SLM is an integrated SLM further including a number of pixels located within a path of the reference beam from the beam-forming optics to the storage medium, and wherein the SLM is adapted to modulate the phase of the light from every pixel on the reference beam to store multiple holographic pages of data in the same physical volume of medium through phase multiplexing.

10. A system according to claim 7, wherein the SLM further comprises a substrate having an upper surface, and wherein the plurality of phase shift elements are disposed above the upper surface of the substrate, a plurality of electrostatically displaceable mirrors, where each phase shift element comprises at least one said mirror; and circuitry for applying voltages causing electrostatic forces between the substrate and the plurality of electrostatically displaceable mirrors to deflect each electrostatically displaceable mirror relative to the upper surface of the substrate.

11. A system according to claim 10, wherein the circuitry for applying the voltages to cause the electrostatic forces is controlled so that each of the plurality of electrostatic mirrors are deflectable in an analog range of distances.

12. A system according to claim 11, wherein the circuitry for applying the voltages to cause the electrostatic forces is controlled so that a gray scale is achieved in the magnitude of the light modulated by the pixels.

13. A system according to claim 10, wherein each of the plurality of electrostatically displaceable mirrors comprise a movable actuator disposed above the upper surface of the substrate, the movable actuator having affixed thereto at least one of said mirrors to reflect light incident on the SLM.

14. A system according to claim 13, wherein the movable actuator is flexibly supported above the upper surface of the substrate by a plurality of posts extending from the upper surface of the substrate and by a plurality of flexures extending from a peripheral edge of the movable actuator to at least one of the plurality of posts.

* * * * *